US006261666B1

(12) United States Patent
Enderby et al.

(10) Patent No.: US 6,261,666 B1
(45) Date of Patent: Jul. 17, 2001

(54) TWO-PLY PAPER PRODUCTS WITH EITHER NESTED OR FOOT-TO-FOOT EMBOSSMENTS AND METHOD OF MAKING

(75) Inventors: Sandra A. Enderby, New Franken; Tim J. Van Straten, Green Bay, both of WI (US)

(73) Assignee: Paper Converting Machine Co., Green Bay, WI (US)

( * ) Notice: Subject to any disclaimer, the term of this patent is extended or adjusted under 35 U.S.C. 154(b) by 0 days.

(21) Appl. No.: 09/134,694

(22) Filed: Aug. 14, 1998

(51) Int. Cl.[7] .................................. B32B 3/00; B31F 1/22

(52) U.S. Cl. .......................... 428/172; 428/154; 428/156; 156/209; 162/109

(58) Field of Search ..................................... 428/156, 172, 428/154, 152; 156/209; 162/109, 113

(56) References Cited

U.S. PATENT DOCUMENTS

| | | | |
|---|---|---|---|
| 2,834,809 | 5/1958 | Schutte . | |
| 3,414,459 | 12/1968 | Wells . | |
| 3,556,907 | 1/1971 | Nystrand . | |
| 3,867,225 | 2/1975 | Nystrand . | |
| 4,325,768 | 4/1982 | Schulz . | |
| 4,326,002 * | 4/1982 | Schulz | 428/178 |
| 4,339,088 | 7/1982 | Niedermeyer . | |
| 4,483,728 | 11/1984 | Bauernfeind . | |
| 4,671,983 | 6/1987 | Burt . | |
| 4,902,366 | 2/1990 | Bader . | |
| 4,926,666 | 5/1990 | Gotting et al. . | |
| 5,173,351 | 12/1992 | Ruppel . | |
| 5,339,730 | 8/1994 | Ruppel et al. . | |
| 5,686,168 | 11/1997 | Laurent et al. . | |
| 5,736,223 | 4/1998 | Laurent . | |

FOREIGN PATENT DOCUMENTS

| | | |
|---|---|---|
| WO 99/14035 | 3/1999 | (WO) . |
| WO 99/41064 | 9/1999 | (WO) . |

* cited by examiner

*Primary Examiner*—Donald Loney

(57) ABSTRACT

A method of producing a paper product which is formed from a pair of embossed webs enables the embossments to be arranged in either a nested or a foot-to-foot configuration. An embossing pattern has a machine direction and a cross-machine direction and is formed by a plurality of embossments. Adjacent embossments are spaced from each other in either or both of the machine direction and the cross-machine direction by an amount which exceeds the dimension of the embossments in that direction. A pair of embossing rolls are engraved with the same embossing pattern. When it is desired to produce foot-to-foot embossments, the embossing rolls are rotatably mounted so that the embossments on each roll are aligned. When it is desired to produce nested embossments, the embossing rolls are rotatably mounted so that the embossments on each of the rolls are positioned between the embossments on the other roll.

15 Claims, 22 Drawing Sheets

TWO-PLY PAPER PRODUCTS WITH EITHER NESTED OR FOOT-TO-FOOT EMBOSSMENTS AND METHOD OF MAKING

BACKGROUND

This invention relates to embossed two-ply paper products such as paper towels and bathroom tissue. More particularly, the invention relates to embossing patterns which can be formed on two plies of paper so that the embossments are in either a nested or a foot-to-foot configuration.

Paper products such as paper towels and bathroom tissue are often formed from two plies of paper sheet material or webs. Such products are commonly formed on a rewinder line in which jumbo rolls of webs are unwound, perforated, and rewound into retail sized rolls. Many rewinder lines include an embosser for forming embossments in one or both of the webs.

When both webs are embossed, the embossments can be arranged in either a foot-to-foot configuration or in a nested configuration. U.S. Pat. No. 3,414,459 describes a foot-to-foot configuration. The embossments or projections of one of the webs are aligned with the embossments of the other web, and the embossments are typically glued together to form a laminated two-ply product.

U.S. Pat. Nos. 3,556,907 and 3,867,225 describe a nested embossed configuration. The embossments of one of the webs are positioned between the embossments of the other web so that the embossments of the two webs do not contact each other. Again, the webs are typically glued together.

Some manufacturers of paper products believe that both nested and foot-to-foot embossed products have certain advantages, and such manufacturers may make both nested and foot-to-foot products. However, different embossment patterns are used for nested and foot-to-foot products. Further, some nested products have a different embossment pattern for each ply.

Embossments are formed in each of the two individual webs by rubber to steel embossing in which steel embossing rolls are engraved with the embossing pattern. The conventional manufacturing process for an embossing roll includes making tooling, using the tooling to make a master roll, and using the master roll to engrave a steel embossing roll. Each different embossment pattern therefore requires costs for tooling, a master roll, and an engraved steel embossing roll. However, other methods could be used to manufacture embossing rolls.

It would be advantageous if the same embossing pattern could be used to make both nested and foot-to-foot embossed products. The same tooling and master roll could then be used to make each of the two steel rolls.

Some old embossing rolls include simple pins or projections for forming the embossments, and the positions of the two embossing rolls can be adjusted to make either nested or foot-to-foot embossments. However, the pins or projections are simply arranged in parallel rows or similar configurations, and the embossments do not form aesthetically pleasing and recognizable designs.

At the present time, many manufacturers of embossed paper products prefer to use embossment patterns which form aesthetically pleasing and recognizable designs such as floral designs, geometric designs such as circles and squares, various polygons, a combination of floral and geometric designs, and the like.

SUMMARY OF THE INVENTION

The invention permits embossing both plies of a two-ply paper product with embossments which form aesthetically pleasing, decorative designs such as floral patterns, geometric patterns, etc. Each embossing roll is engraved with the same design, and the embossing rolls can produce either nested or foot-to-foot embossments. Since the embossing rolls have the same design, the same tooling and master roll can be used to make both embossing rolls.

The embossments which form the decorative designs are spaced from each other in either or both the machine direction, i.e., the direction in which the web advances through the embosser, and the cross-machine direction by an amount which exceeds the dimensions of the embossments in that direction. The spacing between the embossments permits one embossing roll to be shifted relative to the other embossing roll in either or both the machine direction and the cross-machine direction to produce a nested configuration. When the embossing rolls are aligned, they produce a foot-to-foot configuration.

DESCRIPTION OF THE DRAWING

The invention will be explained in conjunction with illustrative embodiments shown in the accompanying drawing, in which.

DESCRIPTION OF THE SPECIFIC EMBODIMENTS

Figure 1:
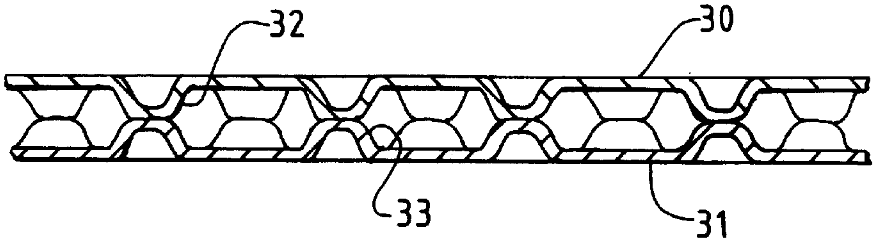
FIG. 1 PRIOR ART
FIG. 1 illustrates a typical prior art two-ply embossed paper product in which the embossments are arranged in a foot-to-foot configuration.

FIG. 1 illustrates a conventional two-ply foot-to-foot embossed paper product such as kitchen toweling. The foot-to-foot embossed product of FIG. 1 can be formed, for example, in accordance with U.S. Pat. No. 3,414,459. The product includes upper and lower plies 30 and 31 of paper sheet material. The upper ply is formed with downwardly projecting embossments 32, and the lower ply is formed with upwardly projecting embossments 33. The embossments contact each other, and adhesive is advantageously applied to the embossments of one of the plies so that the two plies are adhesively secured together.

Figure 2:
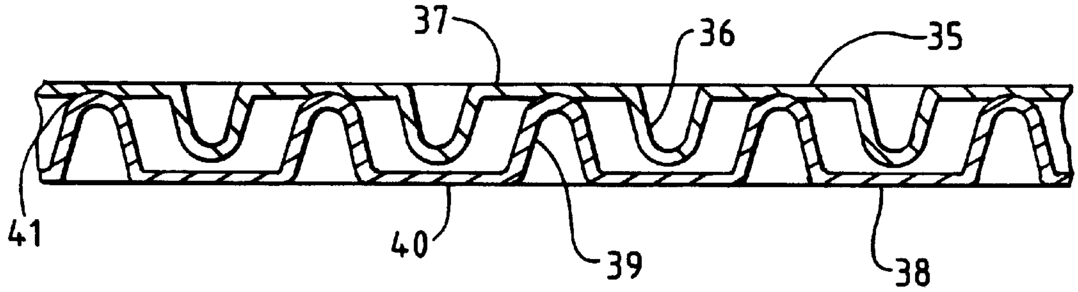
FIG. 2 PRIOR ART
FIG. 2 illustrates a prior art two-ply embossed paper product in which the embossments are arranged in a nested configuration.

FIG. 2 illustrates a conventional two-ply paper product with nested embossments which can be formed in accordance with U.S. Pat. Nos. 3,556,907 and 3,867,225. An upper ply 35 of paper sheet material is provided with downwardly projecting embossments 36 and unembossed areas 37 between the embossments. A lower ply 38 of paper sheet material is provided with upwardly extending embossments 39 and unembossed areas 40 between the embossments. The two plies are arranged so that the embossments of one ply extend into the spaces between the embossments of the other ply. Adhesive 41 is applied to the embossments 39 of the lower ply for adhesively securing the embossments 39 to the unembossed areas 37 of the upper ply.

Figure 3:
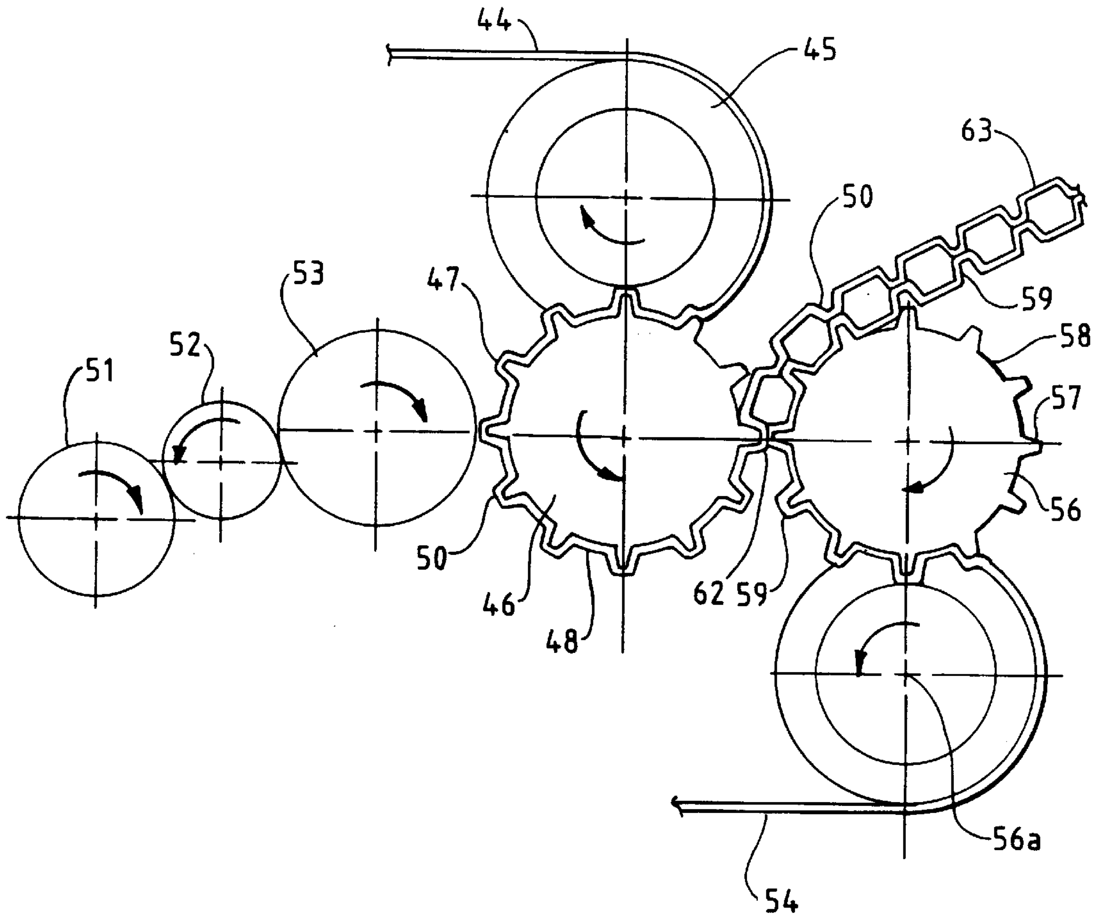
FIG. 3 PRIOR ART
FIG. 3 is a schematic side view of an embossing machine for producing foot-to-foot embossments.

FIG. 3 illustrates a conventional embossing machine for producing two-ply paper products with foot-to-foot embossments. A top web 44 which is unwound from an unwind stand (not shown) passes over an upper rubber-covered roll 45 and a steel embossing roll 46. The embossing roll is engraved to provide embossments or radially outwardly extending projections 47 and unembossed areas 48 between the projections.

The embossing roll 46 is rotatably mounted in the embossing machine, and as the embossing roll 46 and the rubber covered roll 45 rotate, projections 47 on the embossing roll 46 press the upper web into the rubber-covered roll 45 and form embossments 50 on the upper web. Adhesive or glue is picked up from an adhesive fountain (not shown) by a transfer roll 51, and the glue is transferred by transfer roll 52 to an applicator roll 53. The applicator roll 53 contacts the embossments 50 of the upper web and transfers glue to the embossments.

A lower web 54 is unwound from another unwind stand and passes over a lower rubber-covered roll 55 and a second steel embossing roll 56. The embossing roll 56 is also provided with embossments or projections 57 and unembossed areas 58. The projections 57 on the second embossing roll press the lower web into the rubber-covered roll 55 and form embossments 59 on the lower web.

The two embossing rolls are arranged so that the embossments of the two webs are aligned and are pressed together where the projections of the embossing rollers meet at the nip 62 between the embossing rolls. As the embossments of the webs are pressed together, the adhesive on one of the embossments 50 secures the two plies together. The resulting laminated two-ply embossed product 63 advances away from the embossing machine for further processing operations, for example, in a rewinder line.

The second embossing roll 56 is rotatably mounted in the embossing machine. The second embossing roll is also advantageously pivotable relative to the first embossing roll 46 so that the nip 62 can be adjusted. The rotational or longitudinal axes 46*a* and 56*a* of the embossing rolls are parallel.

Figure 4:
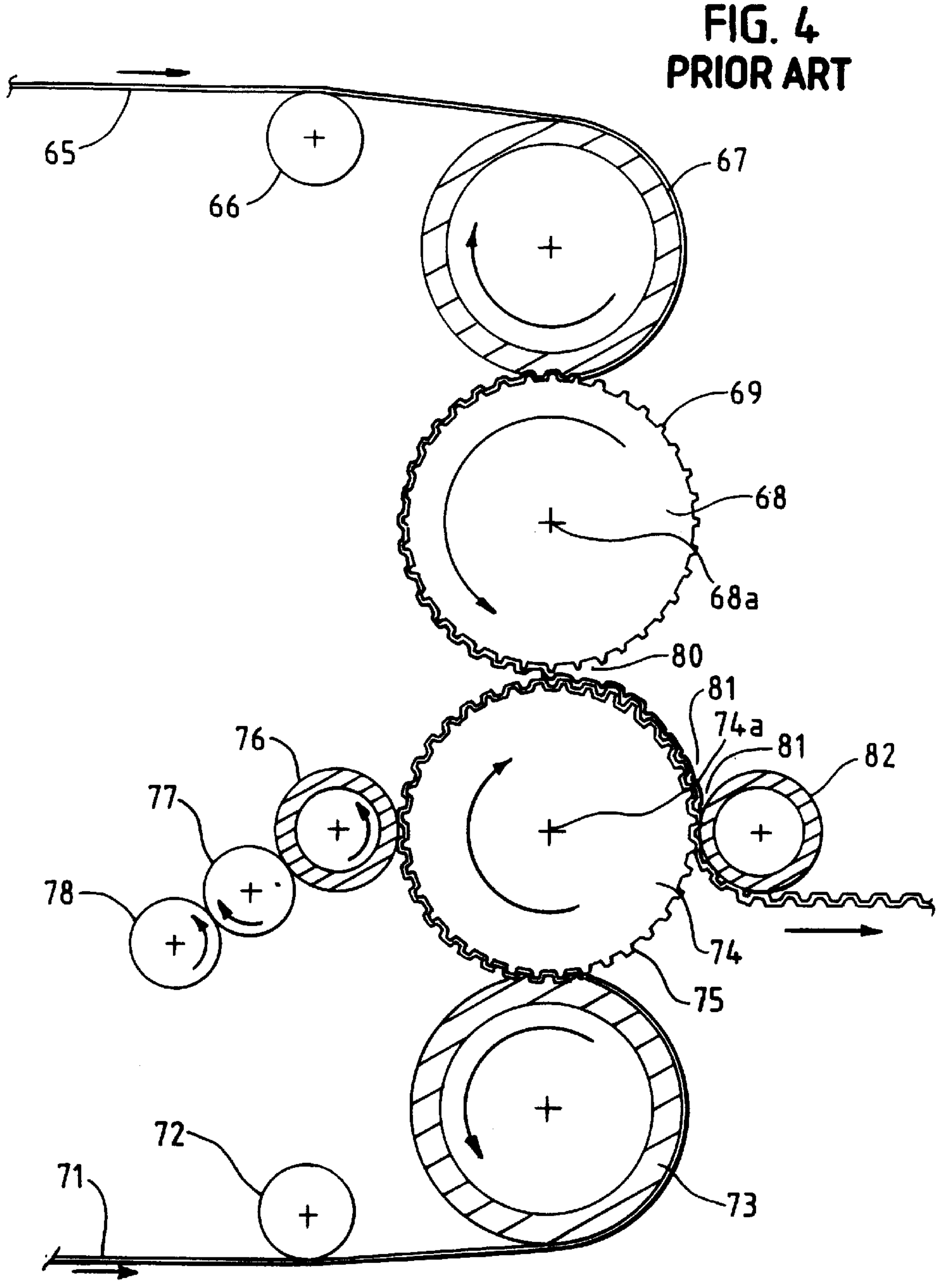
FIG. 4 PRIOR ART
FIG. 4 is a schematic side view of an embossing machine for producing nested embossments.

FIG. 4 illustrates a conventional embossing machine for producing two-ply paper products with nested embossments. An upper web 65 from an unwind stand advances over a bowed roll 66 and around an upper rubber-covered roll 67. An upper embossing roll 68 having projections or embossments 69 presses the upper web into the rubber-covered roll 67 to form embossments in the upper web.

A lower web 71 is advanced from another unwind stand over a bowed roll 72 and around a lower rubber-covered roll 73. A lower embossing roll 74 having projections or embossments 75 presses the lower web into the rubber-covered roll 73 to form embossments in the lower web.

Adhesive is applied to the embossments of the lower web by an adhesive-applying roll 76 which is supplied with adhesive by transfer rolls 77 and 78 and a fountain (not shown).

The axes of rotation 68*a* and 74*a* of the upper and lower embossing rolls are parallel, and the rolls are separated to provide an open nip 80. The projections 69 on the upper embossing roll are offset from the projections 75 on the lower embossing roll so that the projections of the two embossing rolls mesh at the nip 80. The embossed upper web 65 leaves the upper embossing roll 68 at the nip 80 and meshes with the embossed lower web 71 on the lower embossing roll. The two webs are pressed together at a nip 81 between a rubber-covered marrying roll 82 and the lower embossing roll 74, and the adhesive on the embossments of the lower web is pressed against unembossed areas of the upper web to secure the two webs together.

Figure 5:
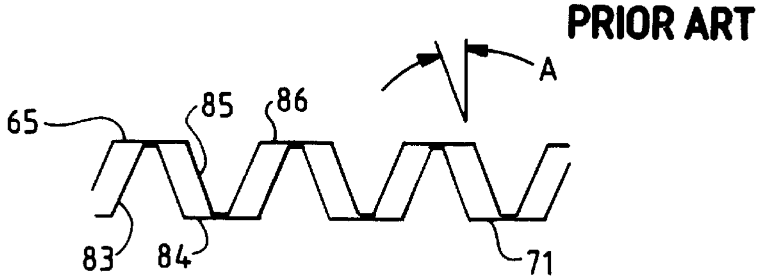
FIG. 5 PRIOR ART
FIG. 5 is an enlarged cross sectional view of the nested embossments produced by the machine of FIG. 4.

FIG. 5 illustrates the laminated two-ply nested embossed product as it is advanced from the marrying roll. The lower web 71 includes upwardly extending embossments 83 and non-embossed areas 84. The upper web 65 includes downwardly extending embossments 85 and non-embossed areas 86. The embossments of each web are positioned in the unembossed areas of the other web, and the glue on the embossments 83 secures the embossments to the unembossed areas 86 of the upper web.

Figure 6:
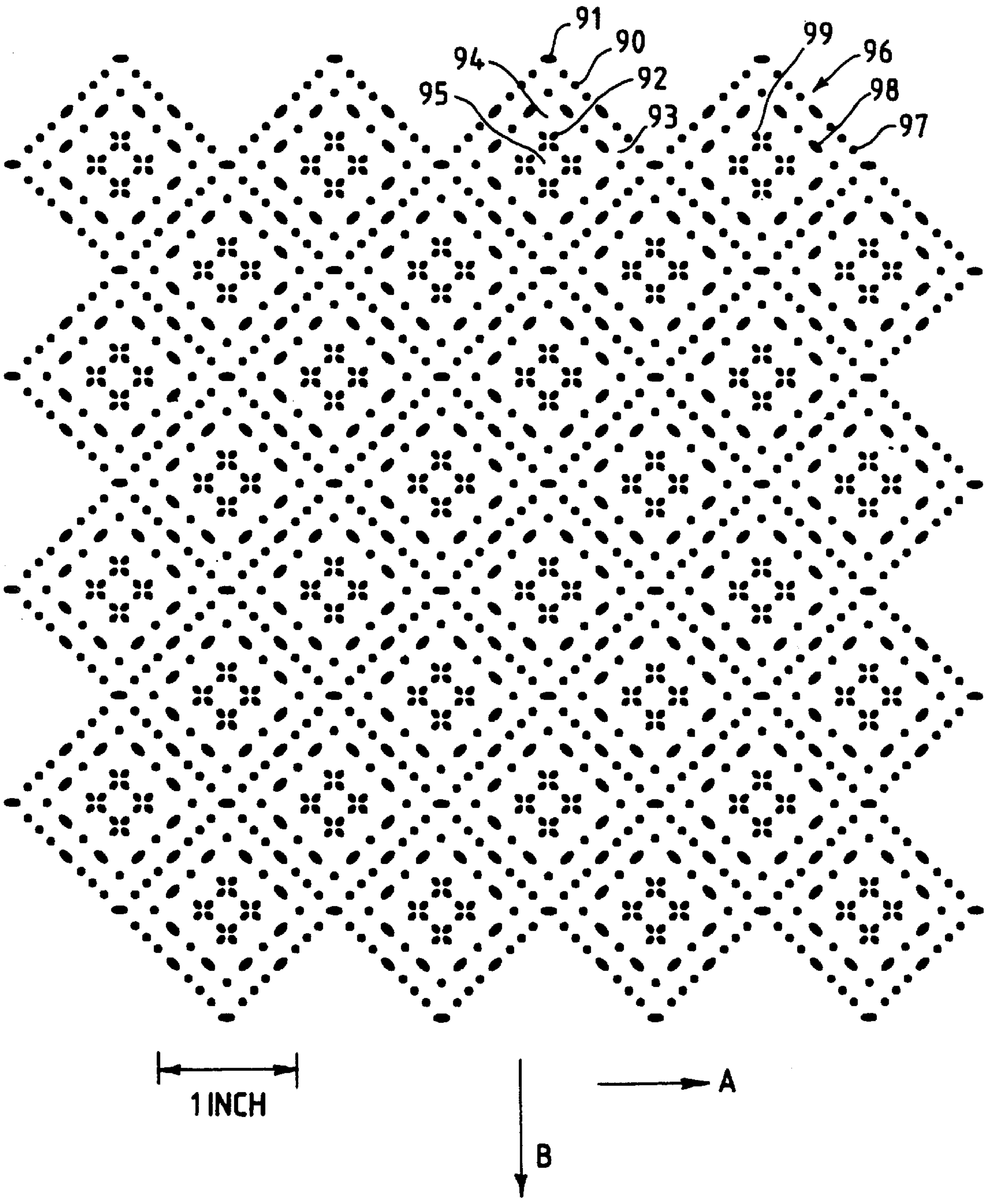
FIG. 6 is a plan view of an embossing pattern formed in accordance with the invention which can be used to produce both foot-to-foot and nested embossments.

FIG. 6 illustrates an embossing pattern which can be engraved on both embossing rolls for use in either a foot-to-foot embossing machine or a nested embossing machine. The same embossing pattern is used on each embossing roll.

The arrow A indicates the machine direction, i.e., the direction in which the web advances over the embossing roll and through the embossing machine. The arrow B indicates the cross-machine direction which extends parallel to the rotational axis of the embossing roll.

The embossing pattern includes embossments which are represented by black marks, for example, 90, 91, and 92. The unmarked areas which surround the embossments, for example, areas 93, 94, and 95, are unembossed areas. The embossing pattern of FIG. 6 includes a decorative rectangular design represented generally by the arrow 96 which repeats in both the machine direction A and the cross-machine direction B. The design 96 is formed by outer and inner rectangular dot-dash lines 97 and 98 which are formed by circular and oval embossments and inner floral or star-shaped designs 99 which are formed by four slightly oval-shaped embossments.

When the embossing pattern of FIG. 6 is used to produce foot-to-foot embossments, the two embossing rolls of FIG. 3 are positioned in the embossing machine of FIG. 3 so that the identical embossing patterns on the two rolls are aligned, i.e., each of the projections or embossments on one of the embossing rolls is aligned with a correspondingly shaped projection or embossment on the other embossing roll. The circumferential and axial positions of one or both of the embossing rolls can be adjusted to facilitate the alignment step. The embossing rolls will therefore produce two embossed webs having the embossing pattern of FIG. 6 in which the embossing patterns are aligned and superimposed.

When the embossing pattern of FIG. 6 is used to produce nested embossments, the embossing rolls are arranged as in FIG. 4. One of the embossing rolls is shifted axially in the cross-machine direction relative to the other roll so that the embossing patterns on the rolls are slightly shifted or offset. Each projection or embossment on each of the embossing rolls is aligned with a space or unembossed area of the other embossing roll.

Figure 7:
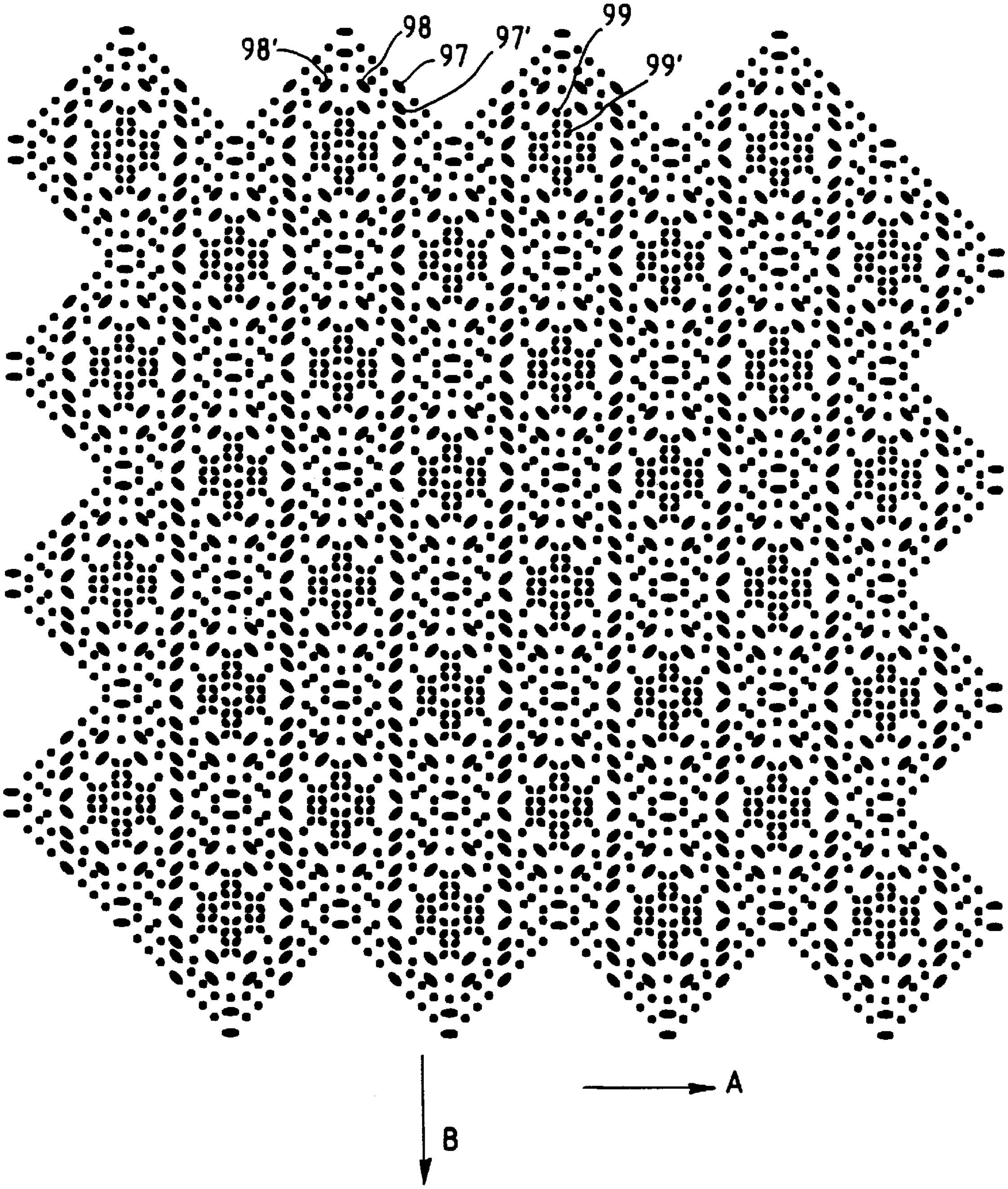
FIG. 7 is a plan view of two webs which have been embossed with the pattern of FIG. 6, one of the webs being shifted in the cross-machine direction so that the embossments of the two webs are nested.

FIG. 7 illustrates the embossing pattern of FIG. 6 which is embossed on two superimposed webs in a nested configuration. The pattern on one of the webs is slightly shifted in the cross-machine direction relative to the pattern on the other web. The embossed dot-dash lines 97 and 98 of one of the webs are offset slightly from the corresponding embossed dot-dash lines 97' and 98' of the other web. Similarly, the star-shaped designs 99 of one of the webs are offset slightly from the corresponding star-shaped designs 99' of the other web.

When the embossing pattern of one of the webs is shifted relative to the embossing pattern of other web to produce a nested configuration, each of the embossments of one of the webs is aligned with an unembossed area of the other web, and each of the embossments of the other web is aligned with an unembossed area of the first web.

The dimension of each of the embossments of FIG. 6 in the cross-machine direction is less than the space between adjacent embossments in the cross-machine direction. Accordingly, the embossments on one of the webs can be shifted in the cross-machine direction so that the embossments are aligned entirely within the spaces on the pattern of the other web. The amount of shifting of the pattern is controlled so that the embossments of the two webs nest and do not contact each other.

Figure 8:
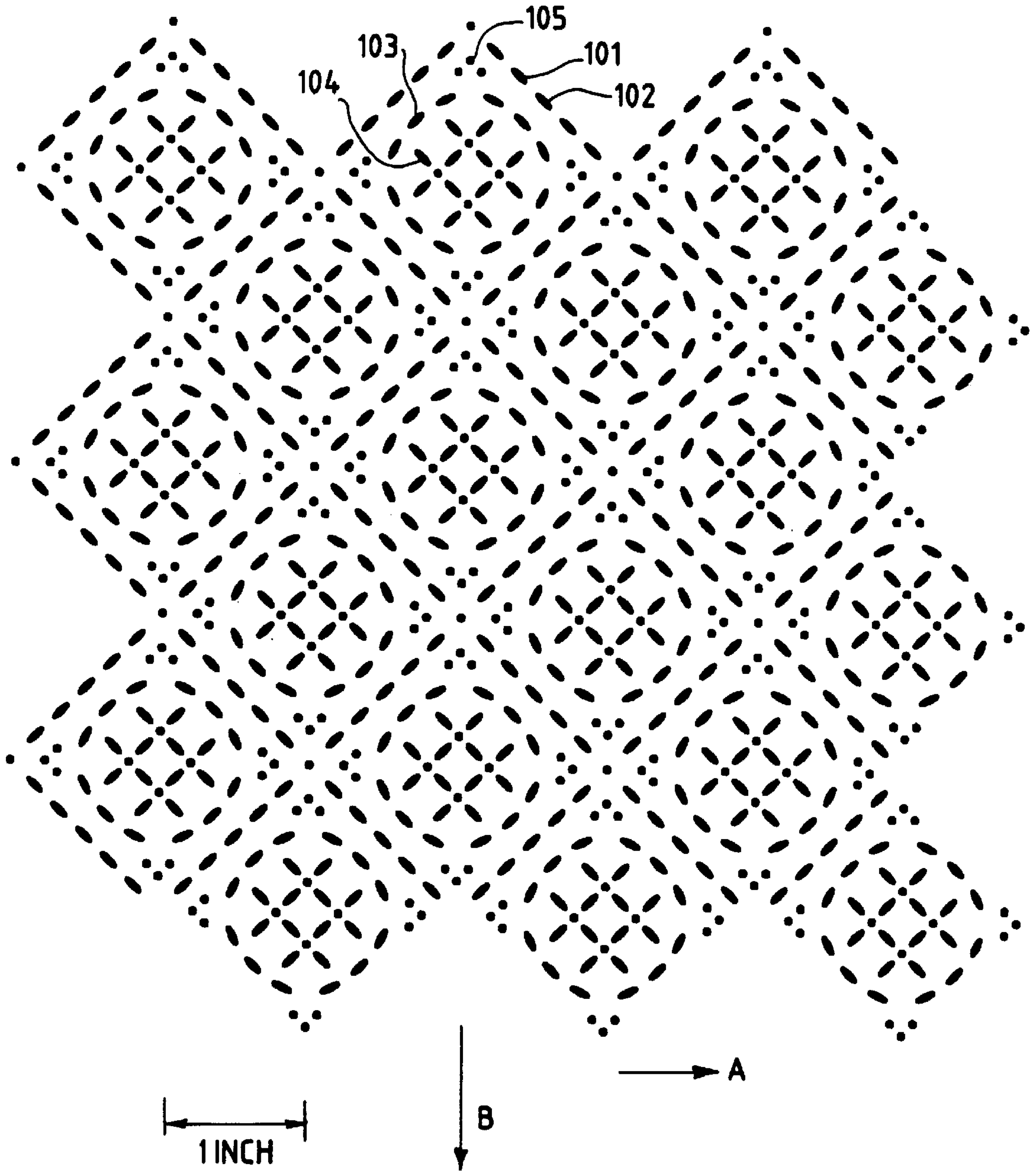
FIG. 8 illustrates another embossing pattern which is formed in accordance with the invention.

FIG. 8 illustrates another embossing pattern which can be used to produce either foot-to-foot embossments or nested embossments. The embossing pattern includes a decorative design 101 which repeats in both the machine direction A and the cross-machine direction B. The decorative design 101 includes an outer rectangular dashed line 102 form by embossments, an inner circular dashed line 103 formed by embossments, an embossed floral design 104 inside of the circle 103, and an embossed dot design 105 in each corner of the rectangle 102.

When the pattern of FIG. 8 is used to produce foot-to-foot embossments, two embossing rollers having the same embossing pattern of FIG. 8 are mounted in the embossing machine of FIG. 3 so that the embossments of each embossing roll are aligned with corresponding embossments of the other embossing roll.

Figure 9:
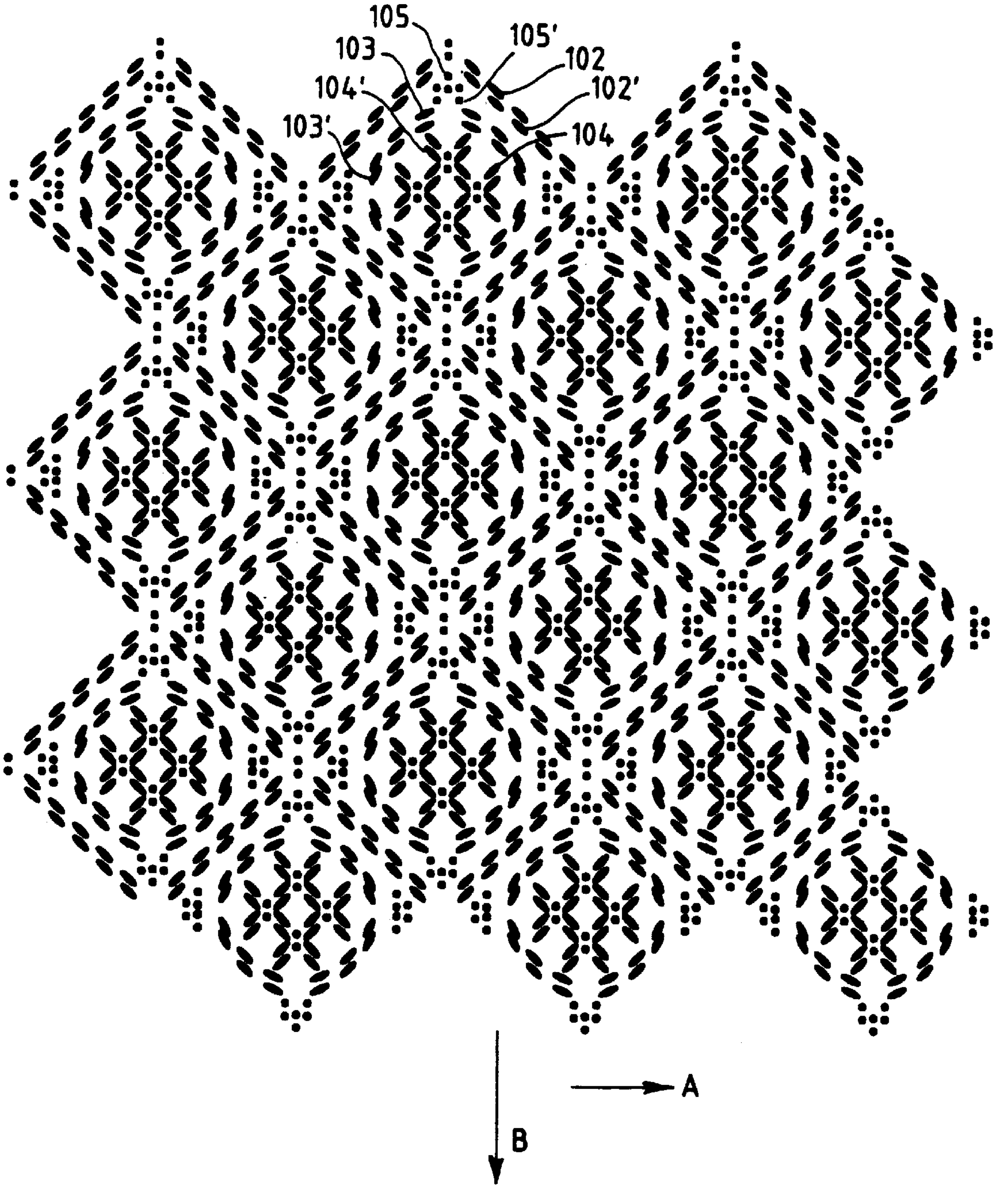
FIG. 9 illustrates two webs with the embossing pattern of FIG. 8, one of the webs being shifted in the cross-machine direction to produce nested embossments.

FIG. 9 illustrates how the embossing pattern of FIG. 8 can be used to produce nested embossments. One of the embossing rolls in FIG. 4 is shifted slightly in the cross-machine B direction relative to the other embossing roll so that the embossments of each roll are aligned with unembossed areas on the other roll. The rectangular line of embossments 102 of one web is offset slightly from the corresponding rectangular line of embossments 102' of the other web, and the circular line 103 of embossments 103 of one web is offset slightly from the corresponding circular line of embossments 103' of the other web. Similarly, the floral design 104 of one web is offset slightly from the floral design 104' of the other web, and the dot designs 105 and 105' are offset.

Figure 10:
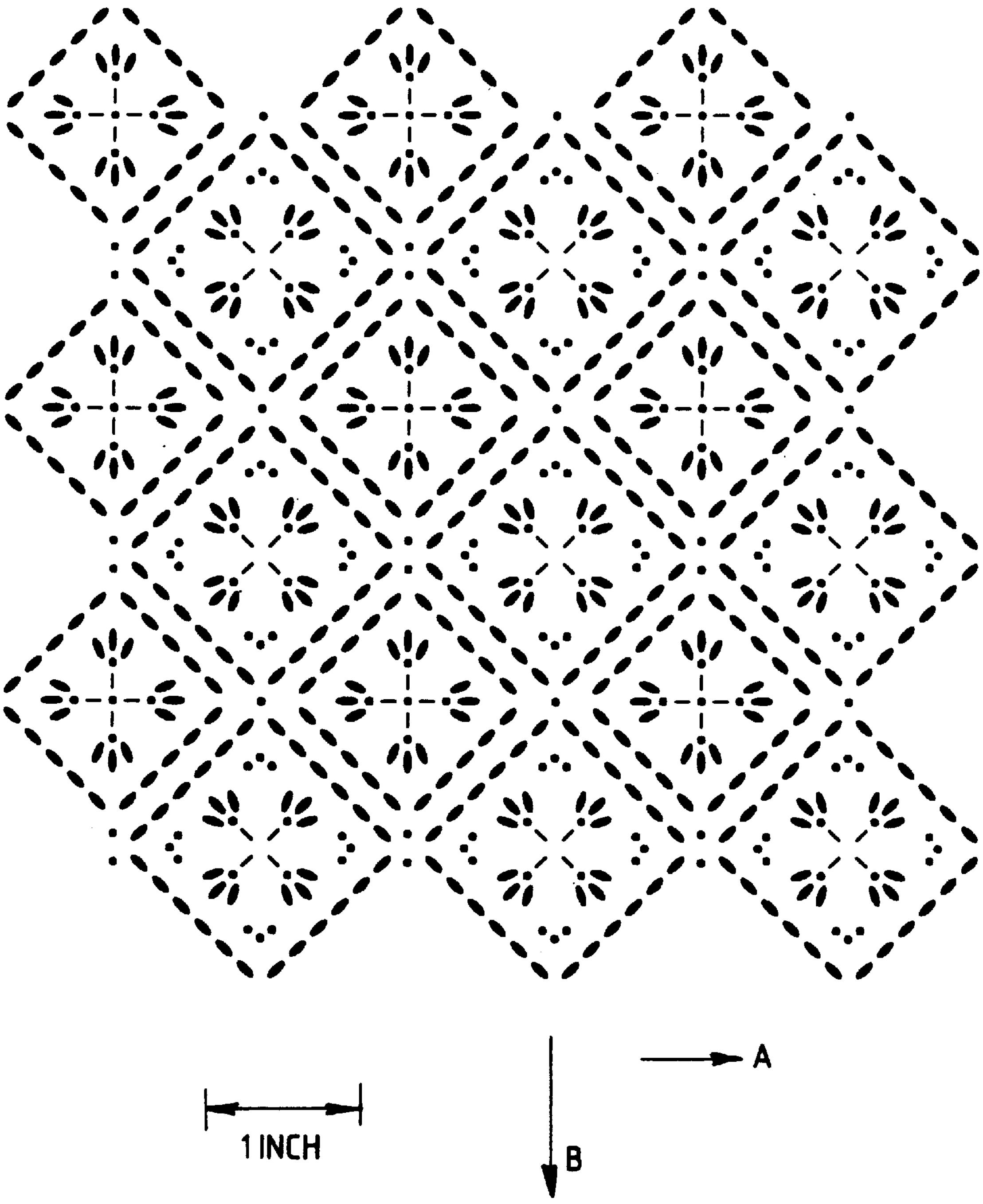
FIG. 10 illustrates another embossing pattern which is formed in accordance with the invention.

FIG. 10 illustrates another embossing pattern which can be used to produce foot-to-foot or nested embossments. The embossing pattern includes a large rectangular design 108 and a small rectangular design 109. Each of the rectangular designs repeats in both the machine direction and the cross-machine direction.

The large rectangular design 108 includes an outer rectangular line 110 of embossments, an inner floral design 111 of embossments, and an embossed dot design 112 in each corner of the rectangle. The small rectangular design 109 includes a rectangular line 113 of embossments and an inner floral design 113 which is similar to the floral design 111 but which is rotated 45°.

When the embossing pattern of FIG. 10 is used to produce foot-to-foot embossments, the two embossing rolls are rotatably mounted so that the embossments on each embossing roll are aligned with correspondingly shaped embossments on the other embossing roll.

Figure 11:
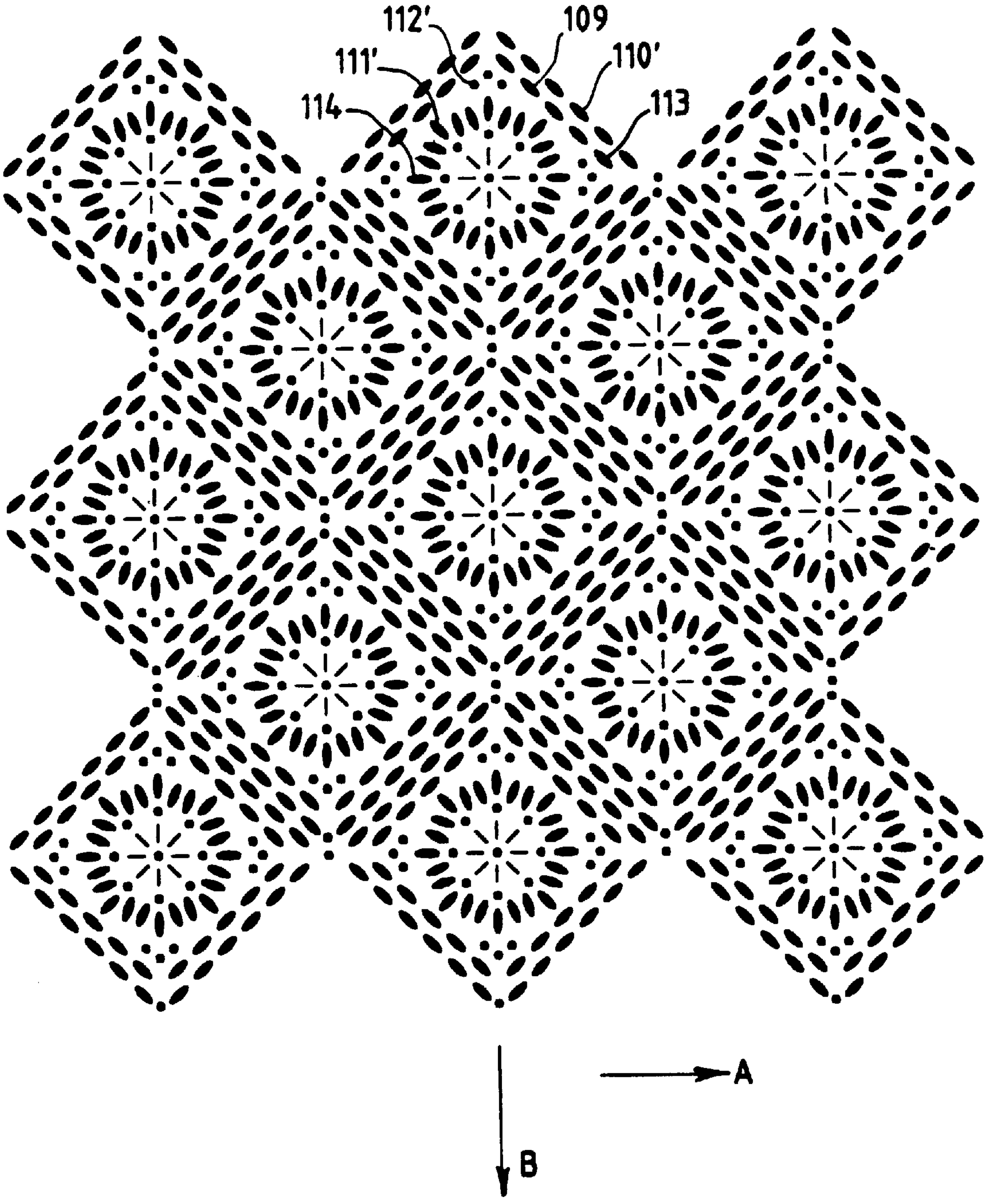
FIG. 11 illustrates two webs with the embossing pattern of FIG. 10, one of the webs being shifted in both the machine direction and the cross-machine direction to produce nested embossments.

FIG. 11 illustrates how the embossing pattern of FIG. 10 can be used to produce nested embossments. One of the embossing rolls of FIG. 4 is both rotated slightly and shifted axially slightly relative to the other embossing roll so that the embossing pattern of one web is shifted in both the machine direction and in the cross-machine direction, i.e., the embossing pattern of one web is shifted generally diagonally relative to the embossing pattern of the other web.

In the nested configuration illustrated in FIG. 11, the small rectangular design 109 of one web is positioned inside of the large rectangular line 110' of the other web. The dot design 112' of the second web is located inside of the corners of the small rectangle 113 of the first web. The floral design 114 of the first web and the floral design 111' of the second web mesh with each other so that the individual embossments of each of the floral designs are aligned with unembossed areas of the other floral design.

Figure 12:
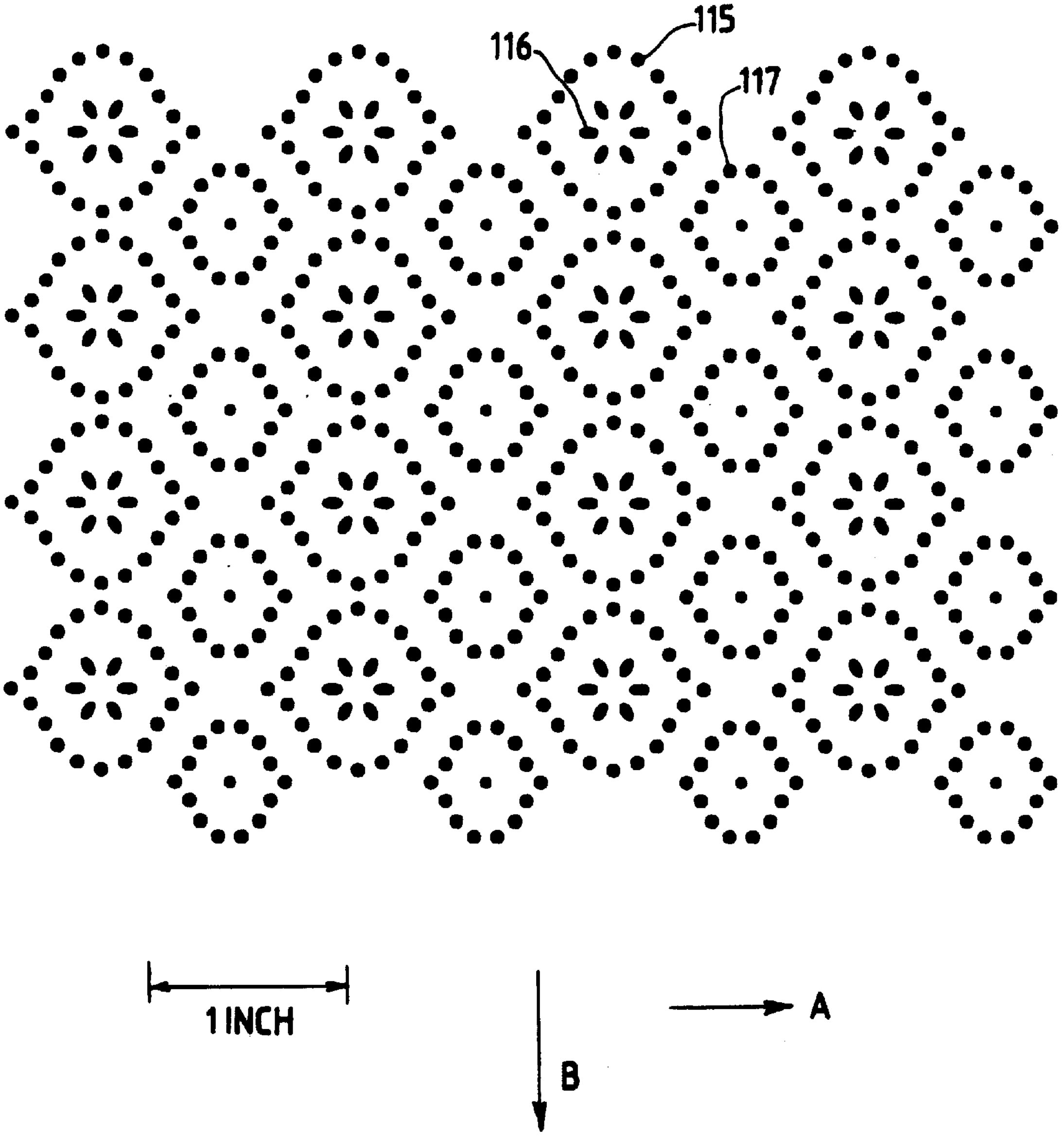
FIG. 12 illustrates still another embossing pattern which is formed in accordance with the invention.

FIG. 12 illustrates yet another embossing pattern which can be used to produce both foot-to-foot and nested embossments. The embossing pattern includes a large generally circular embossed design 115, a starburst embossed design 116 inside of the circular design, and a smaller embossed circular design 117.

Figure 13:
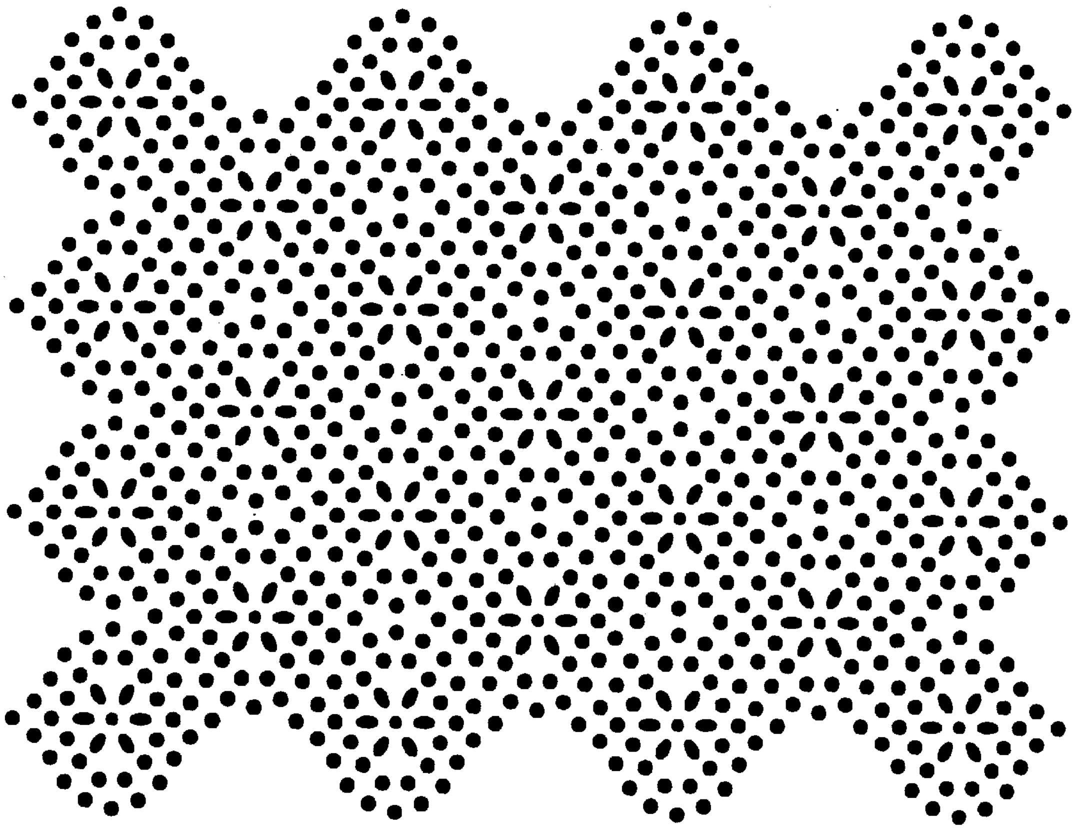
FIG. 13 illustrates two webs with the embossing pattern of FIG. 12, one of the webs being shifted in both the machine direction and the cross-machine direction to produce nested embossments.
Figure 14:
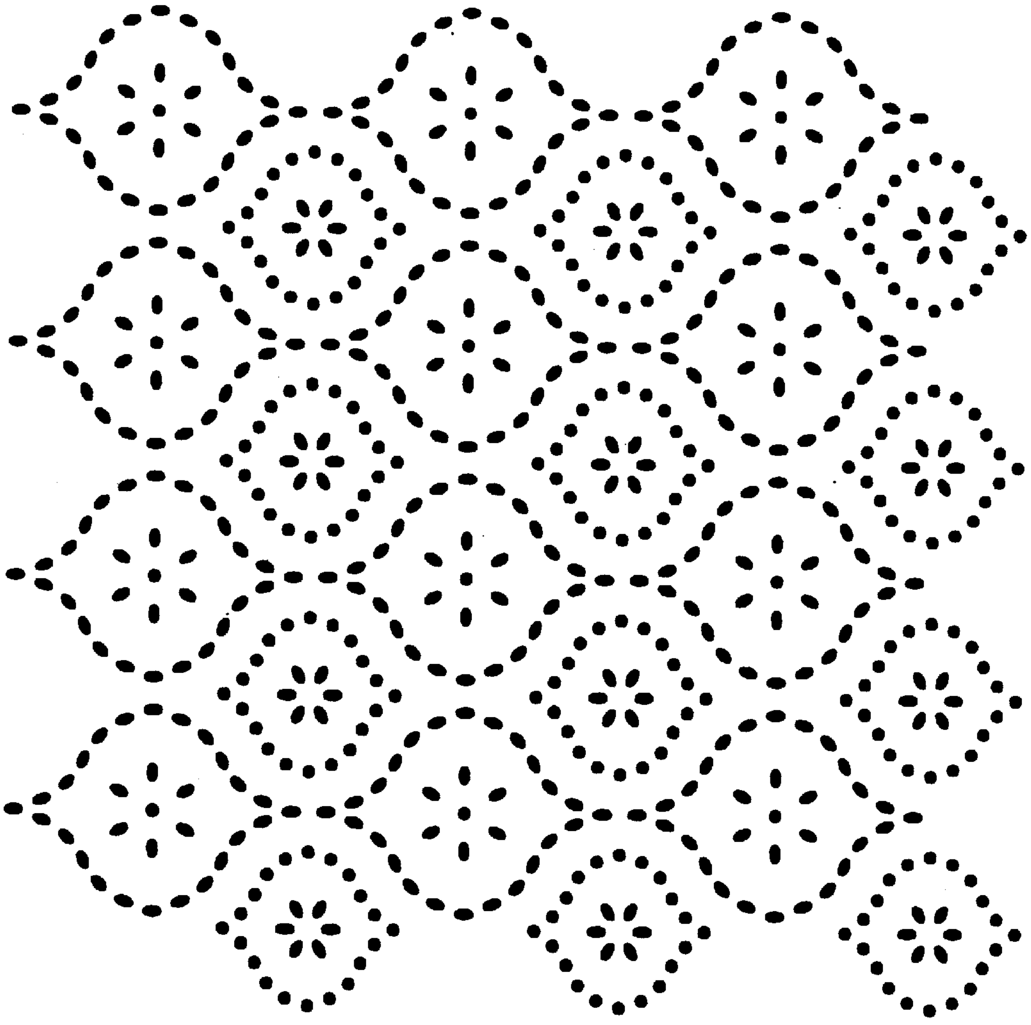
FIG. 14 illustrates yet another embossing pattern which is formed in accordance with the invention.
Figure 15:
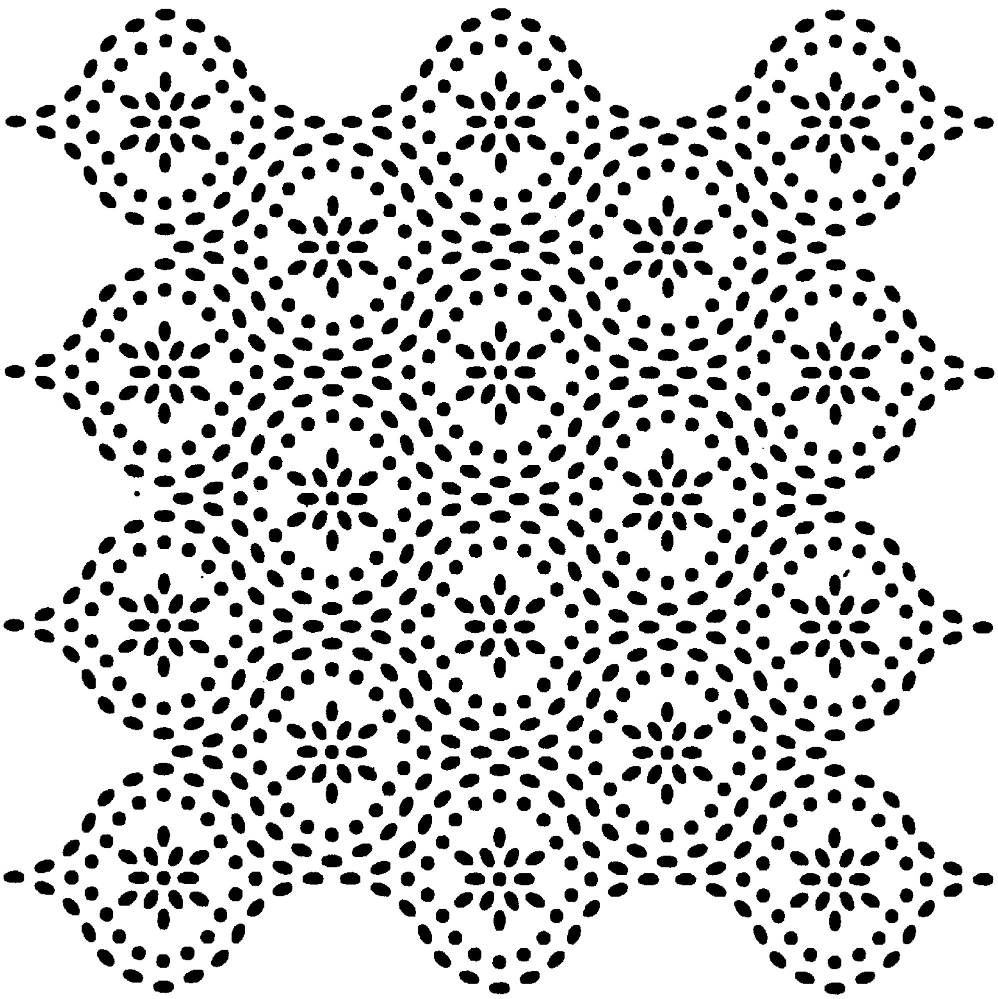
FIG. 15 illustrates two webs with the embossing pattern of FIG. 14, one of the webs being shifted in both the machine direction and the cross-machine direction to produce nested embossments.
Figure 16:
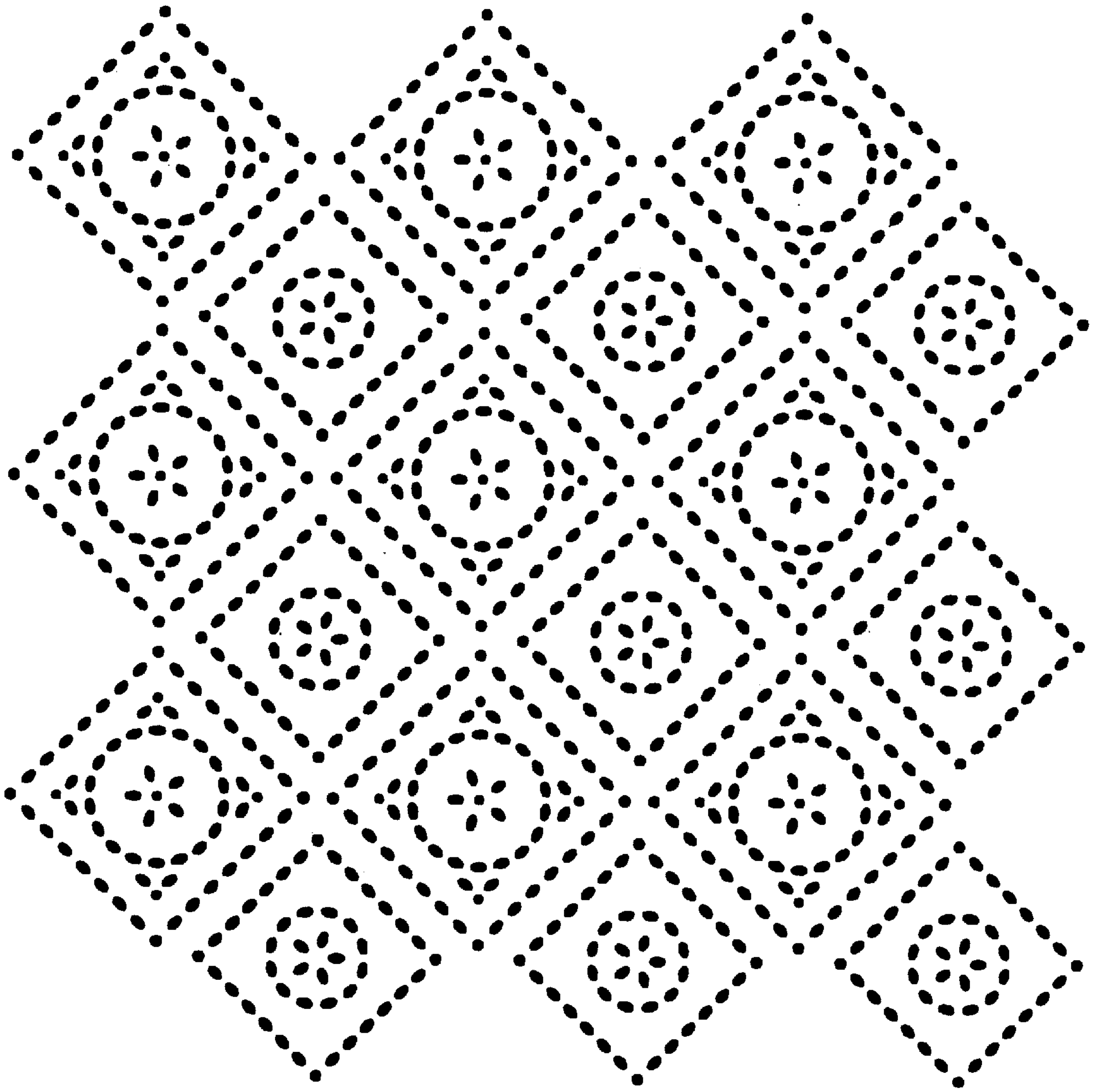
FIG. 16 illustrates another embodiment of an embossing pattern which is formed in accordance with the invention.
Figure 17:
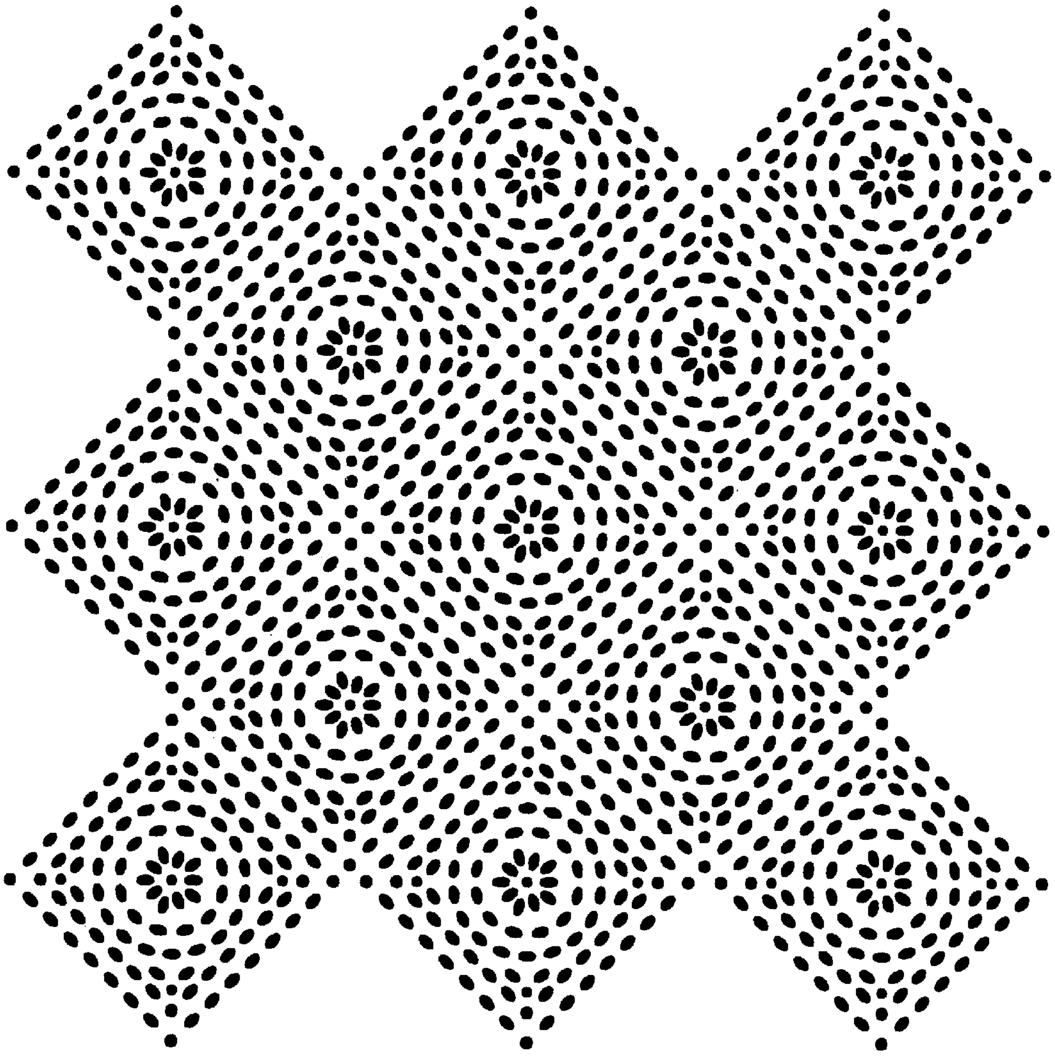
FIG. 17 illustrates two webs with the embossing pattern of FIG. 16, one of the webs being shifted in both the machine direction and the cross-machine direction to produce nested embossments.
Figure 18:
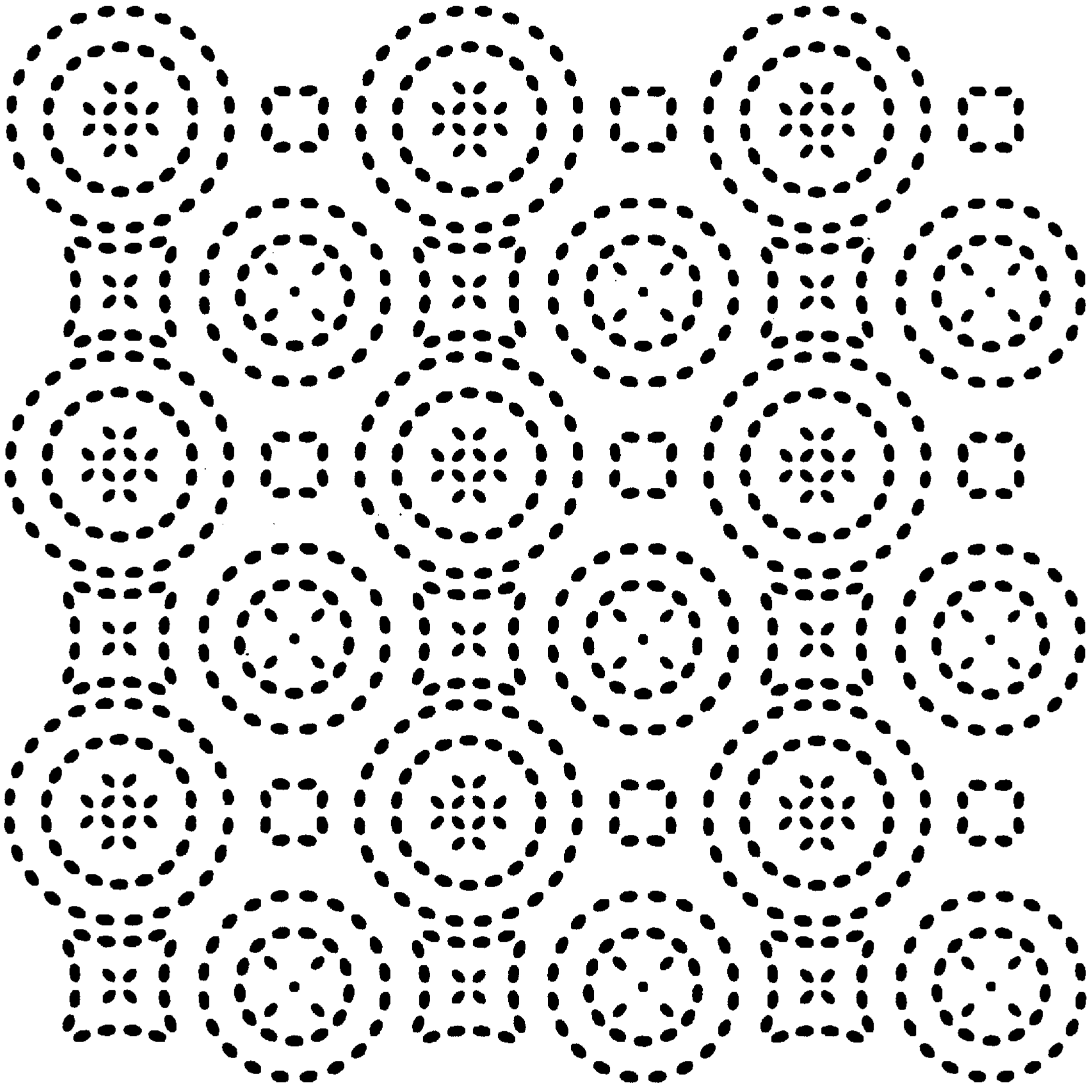
FIG. 18 illustrates a further embodiment of an embossing pattern formed in accordance with the invention.
Figure 19:
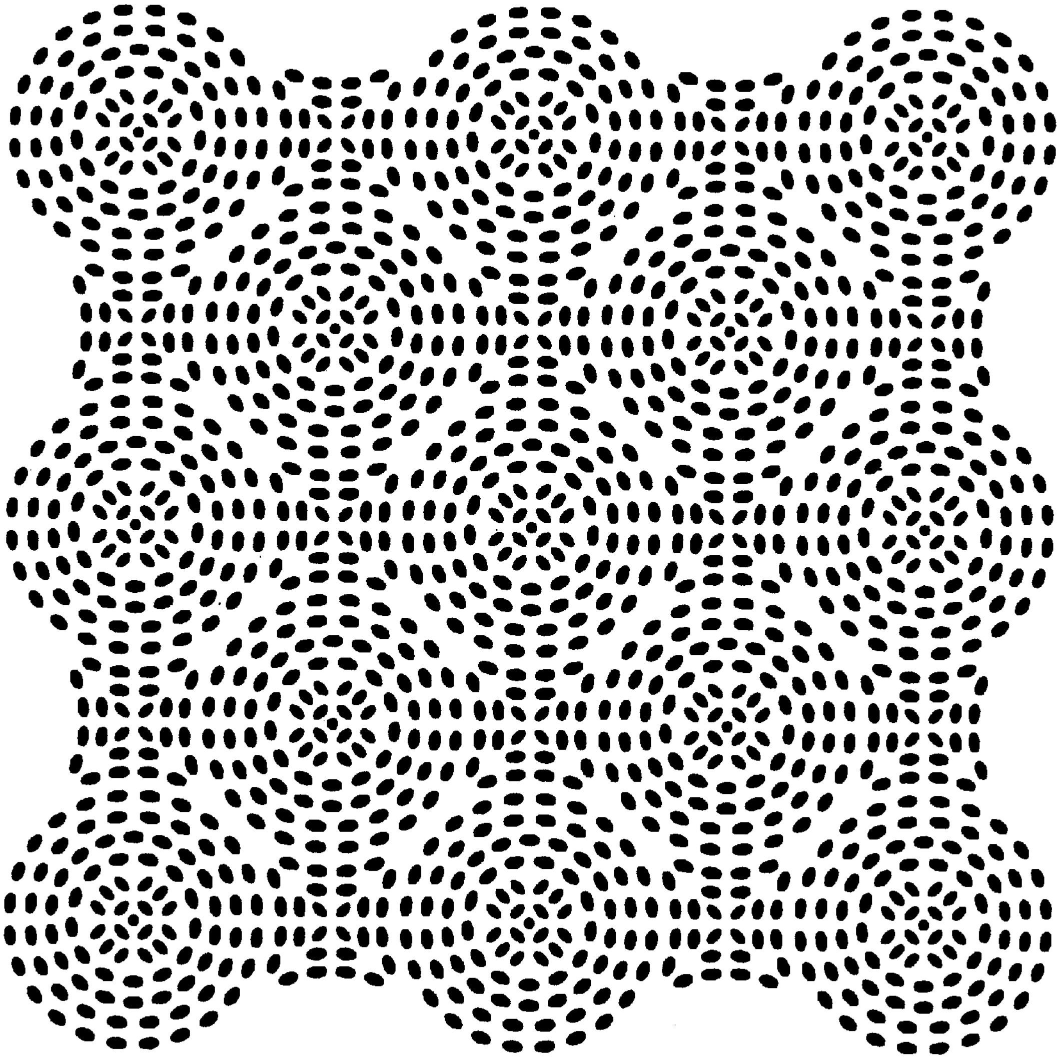
FIG. 19 illustrates two webs with the embossing pattern of FIG. 18, one of the webs being shifted in both the machine direction and the cross-machine direction to produce nested embossments.
Figure 20:
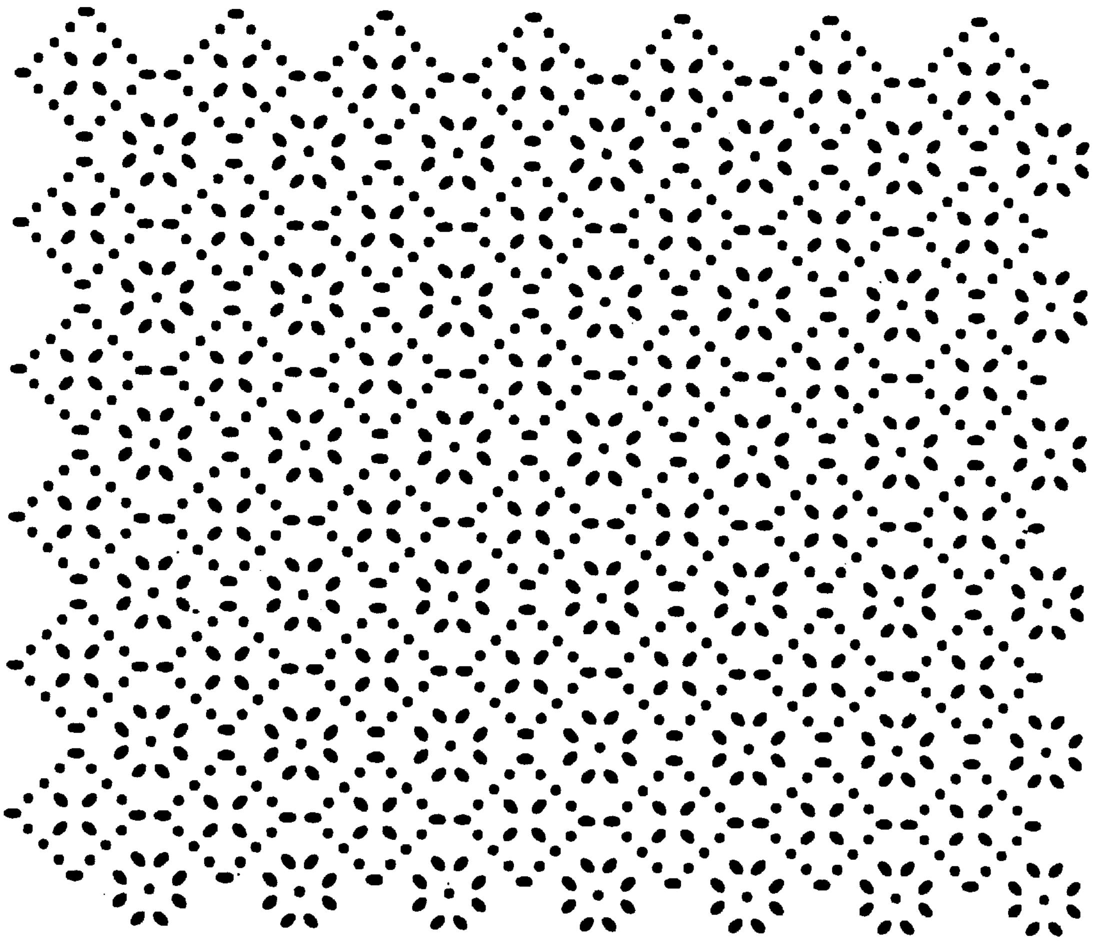
FIG. 20 illustrates still another embodiment of an embossing pattern formed in accordance with the invention.
Figure 21:
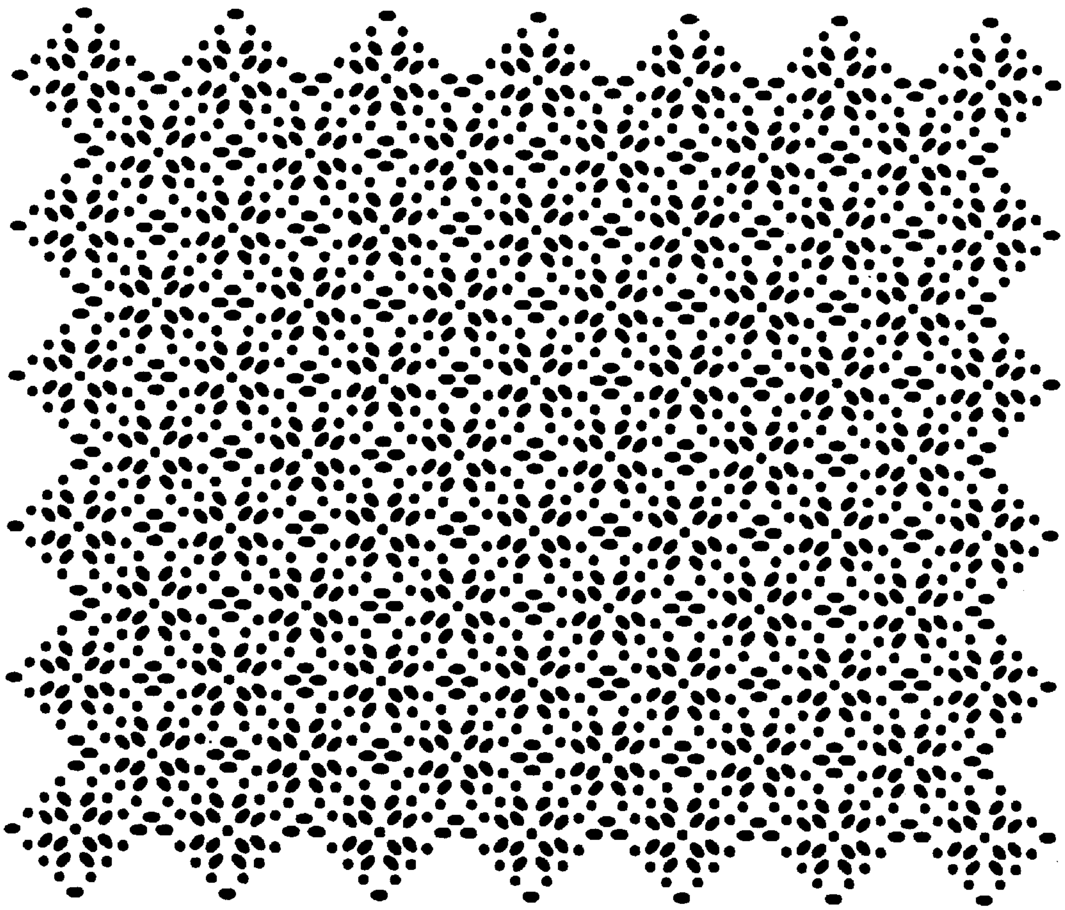
FIG. 21 illustrates two webs with the embossing pattern of FIG. 20, one of the webs being shifted in both the machine direction and the cross-machine direction to produce nested embossments.
Figure 22:
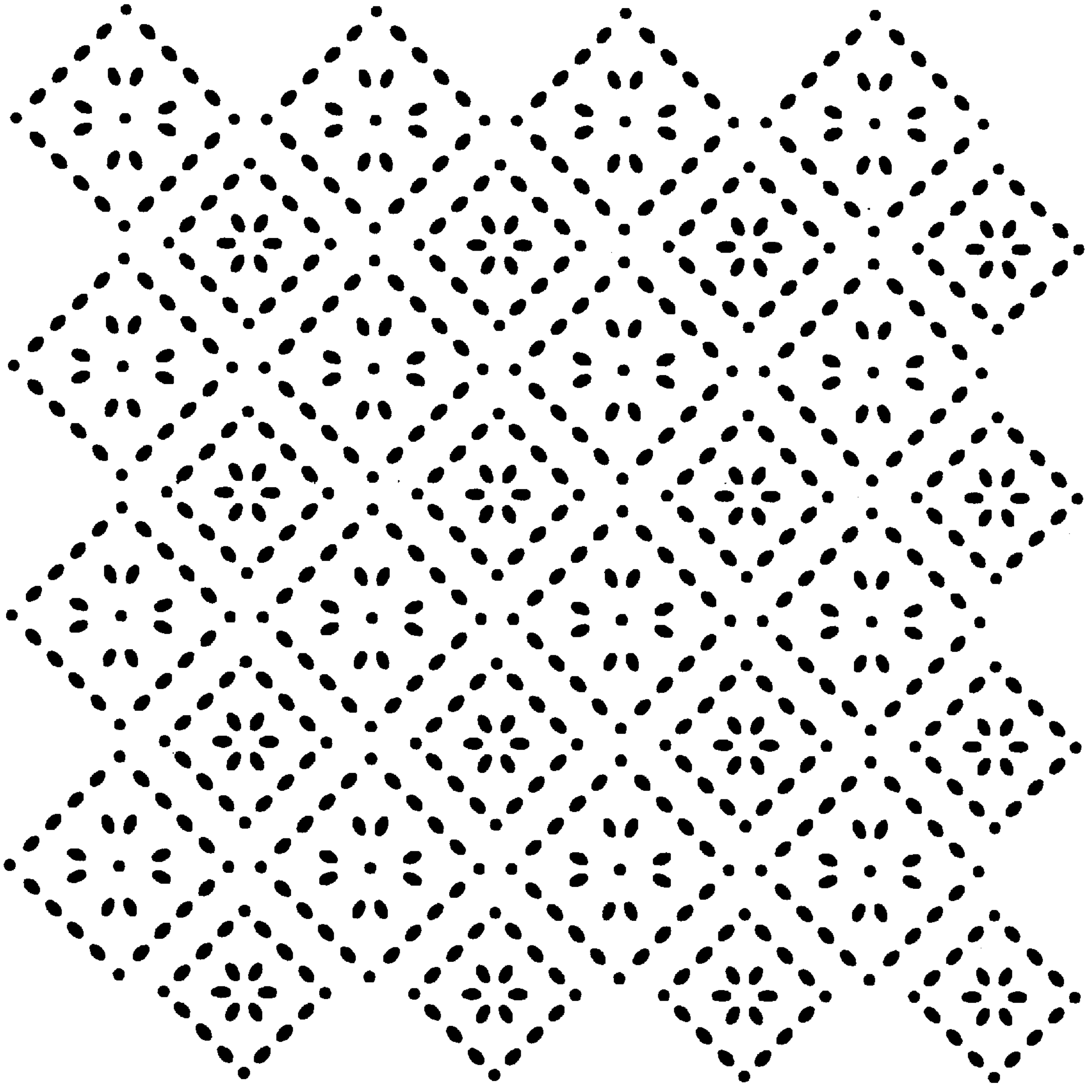
FIG. 22 illustrates another embossing pattern formed in accordance with the invention.
Figure 23:
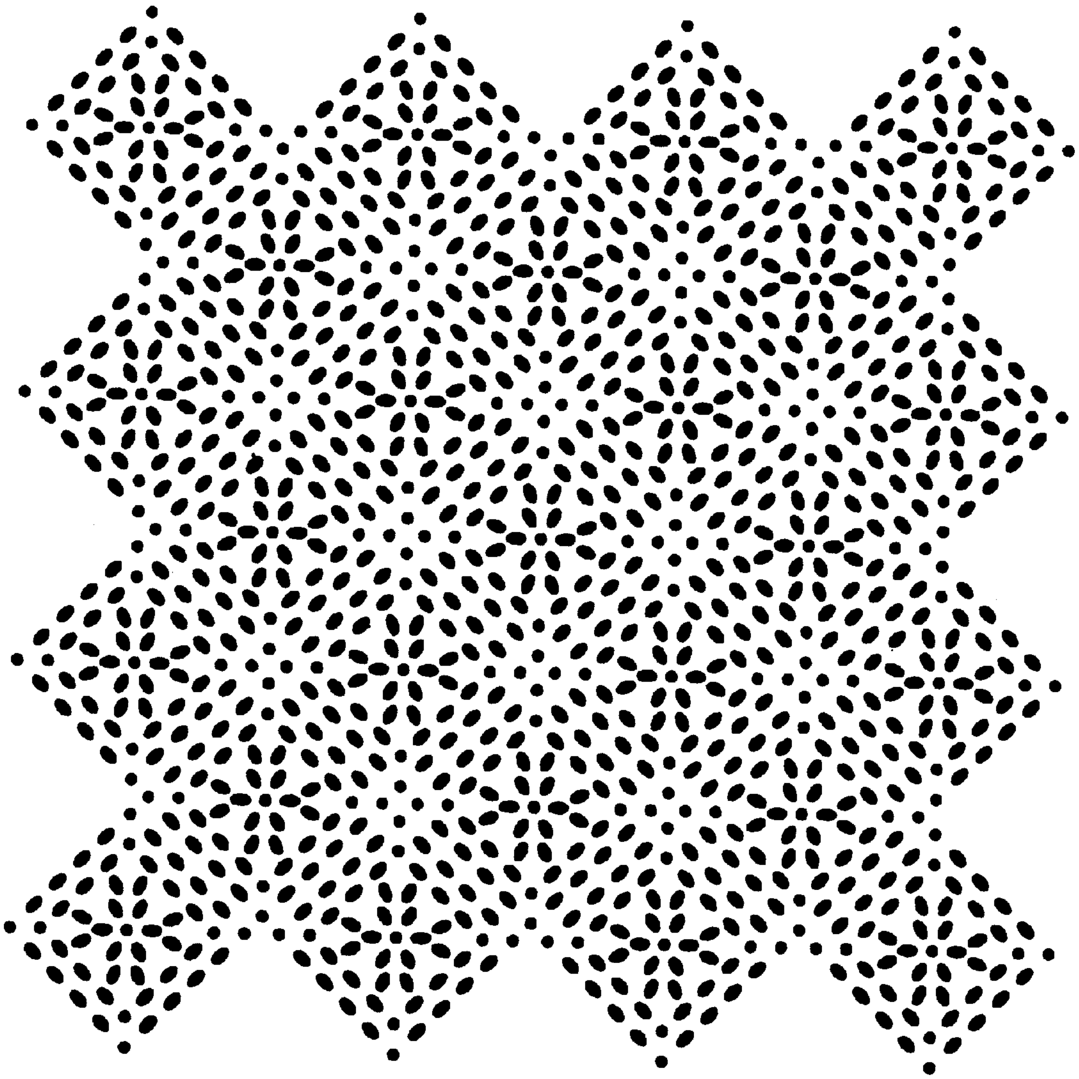
FIG. 23 illustrates two webs with the embossing pattern of FIG. 22, one of the webs being shifted in both the machine direction and the cross-machine direction to produce nested embossments.

FIG. 13 illustrates how the embossing pattern of FIG. 12 can be used to produce nested embossments. One of the embossing rolls is shifted both circumferentially and axially relative to the other embossing roll so that the embossments of one of the embossing rolls are aligned with unembossed areas of the other embossing roll. The embossing pattern of one of the webs is thereby shifted in both the machine direction and the cross-machine direction so that the embossments nest.

FIGS. 14, 16, 18, 20, and 22 illustrate other embossing patterns which can be used to produce both foot-to-foot embossments and nested embossments. In each case, when nested embossments are produced, one of the embossing rolls is shifted both circumferentially and axially so that the embossing pattern of one of the webs is shifted relative to the embossing pattern of the other web in both the machine direction and the cross-machine direction. FIGS. 15, 17, 19, 21, and 23 illustrate the nested embossment configurations which are formed by two identical embossing patterns.

Each of the embossing patterns illustrated herein is formed from decorative, aesthetically pleasing designs. Each design includes design elements which repeat in either or both of the machine direction and the cross-machine direction. The dimensions of the embossments in either or both of the machine direction and the cross-machine direction and the spacing between adjacent embossments in either or both of the machine direction and the cross-machine direction are such that the embossments on one of the webs can be shifted in either or both of the machine direction and cross-machine direction relative to the other web so that each embossment of each web is aligned with an unembossed area of the other web.

Many other embossed patterns can be designed for producing both foot-to-foot and nested embossments. Such embossed patterns advantageously include embossments which form geometric shapes, for example, circles, squares, rectangles, and various other polygons such as hectagons, octagons, diamonds, and embossments which form decorative designs inside of the geometric shapes. The size and shape of the embossments and the space between embossments are such that the embossed pattern of one web can be shifted in either or both of the machine direction or the cross-machine direction so that the embossments of one web will nest between and not contact the embossments of the other web.

Certain design criteria should be applied when designing the embossing patterns of this invention. The bond area between the two webs, i.e., the area of the webs which is glued together, should be within the range of 4% to 20% of the total web area per square inch of web. A more preferred range of bond area for foot-to-foot embossments is 9% to 13%, and a more preferred range of bond area for nested embossments is 6% to 12%. Since the bond area for a particular embossment pattern is generally somewhat different for any particular square inch of web, the bond areas in 10 different square inches of web are averaged in order to determine whether the bond area falls within the foregoing ranges.

In order to better appreciate the dimensions of the embossment patterns which are described herein, the patterns illustrated in FIGS. 6–23 are drawn to scale on the original drawings of this patent application. Since the drawings of the printed patent may be reduced, a one inch scale is included in FIGS. 6, 8, 10, and 12.

The side wall angle or flank angle of the embossments should be within the range of 10° to 30°, and while preferably within the range of 20° to 25°. Referring to FIG. 5, the side wall angle is the angle A between the side wall of the embossment and a vertical plane through the web.

The depth of the embossment should be within the range of 0.040 to 0.080 inch for both nested and foot-to-foot embossments, and more preferably within the range of 0.050 to 0.060 inch.

Figure 25:
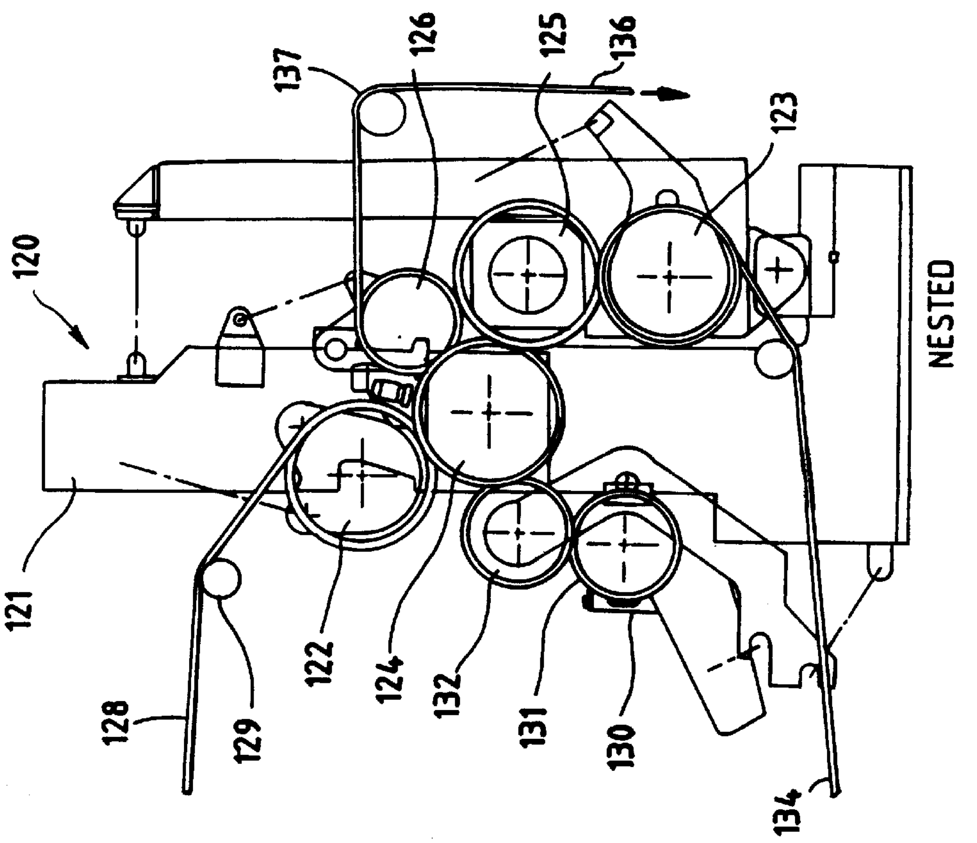
FIGS. 24 and 25 are schematic side views of a combination embossing machine which can produce both foot-to-foot and nested embossments.
Figure 24:
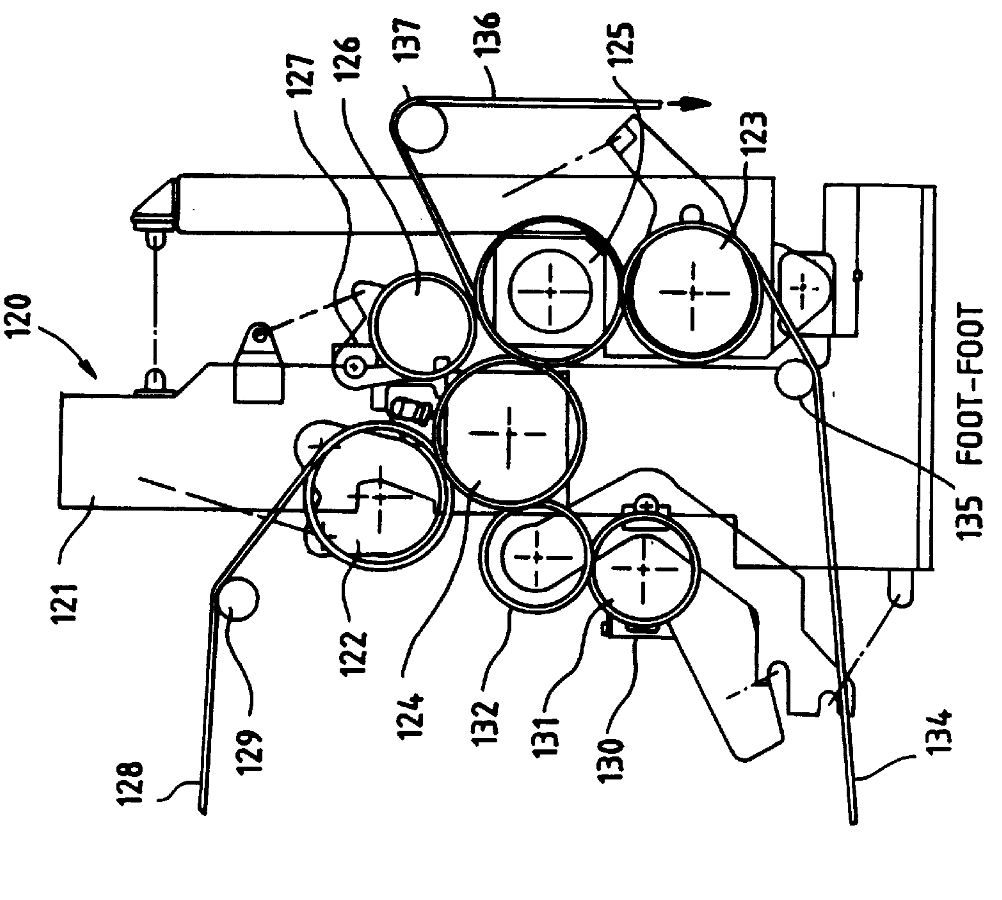

FIGS. 3 and 4 illustrate two different embossing machines for making foot-to-foot and nested embossments. However, combination embossing machines are available which can make both foot-to-foot embossments and nested embossments on the same machine. Referring to FIGS. 24 and 25, a combination embossing machine 120 includes a frame 121 on which are rotatably mounted first and second rubber-covered rolls 122 and 123 and first and second steel embossing rolls 124 and 125. A marrying roll 126 is pivotally mounted on the frame by a pivot arm 127 for pivoting movement toward and away from the first embossing roll 124.

A first web 128 travels over roll 129 and around the first rubber-covered roll 122 and first embossing roll 124. Adhesive is applied to the first web by an enclosed fountain 130, anilox roll 131, and applicator roll 132.

A second web 134 travels over a roll 135 and around the second rubber-covered roll 123 and second embossing roll 125.

FIG. 24 illustrates the combination embosser configured to produce foot-to-foot embossments. The marrying roll 126 is pivoted away from the first embossing roll 124. Both of the embossing rolls 124 and 125 have the same embossing pattern, and the embossments of the two rolls are aligned so that the embossments on the two webs are pressed together in the nip between the two embossing rolls. The laminated two-ply product 136 extends from the second embossing roll 125 and over a roll 137.

FIG. 25 illustrates the combination embosser configured to produce nested embossments. The marrying roll 126 is pivoted against the first embossing roll 124.

The two embossing rolls 124 and 125 are provided with the same embossing pattern, and one of the embossing rolls is shifted in either the machine direction, i.e., rotated, or shifted in the cross-machine direction, i.e., moved axially, or is shifted in both directions relative to the other embossing roll so that the embossments of the two rolls mesh. The embossed second web 134 meshes with the embossed first web 128 in the nip between the embossing rolls. The two webs are pressed together at the nip between the rubber-covered marrying roll 126 and the first embossing roll 124, and the laminated two-ply sheet 136 travels from the marrying roll 126 over the roll 137.

While in the foregoing specification, a detailed description of specific embodiments of the invention was set forth for the purpose of illustration, it will be understood that many of the details herein given can be varied considerably by those skilled in the art without departing from the spirit and scope of the invention.

We claim:

1. In a method of producing a paper product formed from a pair of embossed webs in which the embossments of the webs can be arranged in either a nested or a foot-to-foot configuration, the steps of:

forming first and second embossing rolls with the same embossing pattern, each of said rolls having a rotational axis, the embossing pattern being formed by a plurality of embossments and non-embossed areas which surround the embossments, the embossing pattern having a machine direction and a cross-machine direction, the embossments forming a decorative design and each embossment having a dimension in the machine direction and a dimension in the cross-machine direction, adjacent embossments being spaced from each other in either or both of the machine direction and the cross-machine direction by an amount which exceeds the dimensions of the embossments in that direction, rotatably mounting the first and second embossing rolls so that the axes of the rolls are parallel and the embossments of each roll are aligned whereby the rolls produce foot-to-foot embossments in said paper product, and rotatably mounting the first and second embossing rolls so that the axes of the rolls are parallel and the embossments of one roll are positioned between embossments of the other roll whereby the rolls produce nested embossments in said paper product.

2. The method of claim 1 in which the embossments are spaced from each other in the machine direction by an amount which exceeds the dimensions of the embossments in the machine direction and the embossments are spaced from each other in the cross-machine direction by an amount which exceeds the dimensions of the embossments in the cross-machine direction.

3. The method of claim 1 in which the embossments are arranged to form geometric designs.

4. The method of claim 1 in which the geometric designs include polygons.

5. The method of claim 3 in which the geometric designs include rectangles.

6. The method of claim 3 in which the geometric designs include circles.

7. The method of claim 3 in which the embossments form a design inside at least some of the geometric designs.

8. A two-ply nested embossed paper product comprising an upper ply of paper and a lower ply of paper, each of the plies being embossed with the same embossing pattern to provide the ply with embossments and non-embossed areas which surround the embossments, some of the embossments being arranged to form geometric designs which enclose other embossments, the embossing pattern of one of the plies being shifted relative to the embossing pattern of the other ply so that the embossments of each ply are aligned with non-embossed areas of the other ply and the embossments of each ply are nested with the embossments of the other ply.

9. The product of claim 8 in which said geometric designs include polygons.

10. The product of claim 9 in which said geometric designs also includes circles.

11. The product of claim 8 in which said geometric designs include rectangles.

12. The product of claim 8 in which said geometric designs include circles.

13. The method of claim 1 in which said second step of rotatably mounting the first and second embossing rolls includes rotating said one roll relative to said other roll by an amount which is less than the spacing between adjacent embossments in the machine direction.

14. The method of claim 1 in which said second step of rotatably mounting the first and second embossing rolls includes shifting said one roll axially relative to said other roll by an amount which is less than the spacing between adjacent embossments in the cross-machine direction.

15. The method of claim 1 in which said second step of rotatably mounting the first and second embossing rolls includes rotating said one roll relative to said other roll by an amount which is less than the spacing between adjacent embossments in the machine direction and shifting said one roll axially relative to said other roll by an amount which is less than the spacing between adjacent embossments in the cross-machine direction.

* * * * *